United States Patent
Rapp

(10) Patent No.: US 6,919,659 B2
(45) Date of Patent: Jul. 19, 2005

(54) ROTOR ASSEMBLY FOR AN ELECTRIC MOTOR AND ELECTRIC MOTOR WITH INTERNAL ROTOR

(75) Inventor: Harald Rapp, Eschbronn (DE)

(73) Assignee: Minebea Co., Ltd. (JP)

( * ) Notice: Subject to any disclaimer, the term of this patent is extended or adjusted under 35 U.S.C. 154(b) by 167 days.

(21) Appl. No.: 10/332,872

(22) PCT Filed: Jul. 6, 2001

(86) PCT No.: PCT/EP01/07796
§ 371 (c)(1),
(2), (4) Date: May 2, 2003

(87) PCT Pub. No.: WO02/07290
PCT Pub. Date: Jan. 24, 2002

(65) Prior Publication Data
US 2003/0178903 A1 Sep. 25, 2003

(30) Foreign Application Priority Data
Jul. 14, 2000 (DE) .......................... 100 34 302

(51) Int. Cl.[7] ............................................... H02K 7/08
(52) U.S. Cl. ......................................... 310/90; 310/261
(58) Field of Search .......................... 310/90, 261, 86, 310/89

(56) References Cited
U.S. PATENT DOCUMENTS

| | | | | |
|---|---|---|---|---|
| 2,782,352 A | * | 2/1957 | White | 310/261 |
| 2,875,694 A | * | 3/1959 | Carter | 417/357 |
| 3,138,105 A | * | 6/1964 | White | 417/357 |
| 4,017,964 A | * | 4/1977 | Schulte et al. | 29/596 |
| 4,118,644 A | * | 10/1978 | Schulte et al. | 310/42 |
| 4,716,648 A | * | 1/1988 | Nel | 29/596 |
| 4,999,533 A | * | 3/1991 | King et al. | 310/90 |
| 5,667,309 A | | 9/1997 | Nose | 384/132 |
| 6,150,747 A | * | 11/2000 | Smith et al. | 310/258 |
| 6,166,468 A | * | 12/2000 | Suzuki et al. | 310/90 |
| 6,296,391 B1 | | 10/2001 | Hayakawa et al. | 384/119 |
| 2002/0051588 A1 | | 5/2002 | Koseki et al. | 384/100 |

FOREIGN PATENT DOCUMENTS

| | | | |
|---|---|---|---|
| DE | 1 223 628 | 7/1961 | |
| JP | 10196646 A | 7/1998 | ........... F16C/17/10 |
| JP | 2001012458 A | 1/2001 | ........... F16C/17/10 |
| JP | 2002188635 A | 5/2002 | ........... F04D/29/08 |
| NL | 1163018 | 10/1965 | ........... F16C/17/16 |

OTHER PUBLICATIONS

Search Report, Germany, Apr. 11, 2003.

* cited by examiner

Primary Examiner—Dang Le
Assistant Examiner—Nguyen Hanh
(74) Attorney, Agent, or Firm—Joel Lutzker; Anna Vishev; Schulte Roth & Zabel LLP

(57) ABSTRACT

An electric motor having a stator arranged on a sleeve; and a rotor assembly having a rotor shaft and at least one permanent magnet arranged on the rotor shaft, the rotor shaft being rotatbly housed in the sleeve. An external dimension of the rotor assembly and an internal dimension of the stator are selected such that the rotor assembly is free to move in the axial direction while the rotor assembly is inserted into the stator. The rotor assembly is aligned within the stator in the magnetic center of the stator by self-centering magnetic forces.

14 Claims, 5 Drawing Sheets

ROTOR ASSEMBLY FOR AN ELECTRIC MOTOR AND ELECTRIC MOTOR WITH INTERNAL ROTOR

CROSS REFERENCE TO RELATED APPLICATIONS

This application is a national stage U.S. Patent Application and claims all rights of priority to International PCT Application No. PCT/EP01/07796, filed Jul. 4, 2001 (pending), which in turn claimed all rights of priority to German Patent Application No. 100 34 302.3, filed Jul. 14, 2000 (pending).

FIELD OF INVENTION

The present invention refers to a rotor assembly for an electric motor which has a rotor shaft and at least one permanent magnet arranged on the rotor shaft, an internal-rotor electric motor employing such a rotor assembly, and a method for manufacturing such an internal-rotor electric motor.

The invention relates to the field of brushless electric motors having permanent magnets and specifically to the field of d.c. motors configured as so-called internal-rotor electric motors. Internal-rotor electric motors comprise a rotor assembly which includes a rotor shaft and one or more permanent magnets arranged on the rotor shaft and which is inserted in a stator unit including a stator body and field windings.

BACKGROUND OF THE INVENTION

A construction of such a motor is described in U.S. Pat. No. 5,970,600. The motor comprises a frame in which the stator, the rotor assembly and bearings for rotatably journaling the rotor assembly are contained. The stator comprises a stator iron core and windings and it defines an interior space into which the motor assembly can be inserted. In U.S. Pat. No. 5,970,600, the bearings for the rotor assembly are integrated in end caps of the motor frame whereby a compact structure can be obtained altogether.

A problem arising in the manufacture of such an internal-rotor electric motor is that when the rotor assembly is inserted into the interior space of the stator, ferro-magnetic particles may be abraded from the rotor magnet and may enter the working air gap which is essentially defined by the outer contour of the rotor magnet and the inner contour of the stator. It is possible and common practice to protect the entire motor assembly against penetration of foreign particles and soils by providing a housing after the assembly, like in U.S. Pat. No. 5,970,600, but during the assembly of the various motor components the interior of the motor, and in particular the working air gap, is not protected against the penetration of such foreign particles.

Moreover, internal-rotor electric motors according to the prior art have the disadvantage of a relative time-consuming assembly, because it is mainly a sequential assembly in which the stator and at least one bearing must be successively pre-assembled in the housing and then the rotor assembly must be fitted into the stator and bearing. In general, the required concentricity of the components is produced only by a cover-like flange in which also the second bearing is located in which the rotor shaft is rotatably journaled. This assembling step is made much more difficult by the magnetic forces which come from the rotor magnet and are radially and axially directed by interaction with the stator iron core so that a contactless concentric fitting of the rotor is not possible at all or is possible only with major engineering.

From German patent No. 32 37 196, a synchronous micro motor is known which comprises a one-piece pot-like housing which encloses as a ferromagnetically effective yoke the ironless field windings and includes a rotor arranged within the field windings. The permanent magnets of the rotor are arranged on a sleeve made of a magnetically conductive material. The rotor is housed in a hermetically sealed housing containing the bearings and the torque is delivered through a permanent-magnetic coupling one part of which being formed by the permanent magnets of the rotor and the other part of which consists of a permanent-magnetic arrangement on a shaft outside the rotor frame. The hermetic encapsulation of the rotor ensures that no foreign particles can penetrate into the rotor; the bearings are self-lubricated and are protected against environmental impacts. The whole of the motor is assembled by inserting the hermetically encapsulated rotor into the cylindrical hollow space of a pot-like sleeve open on one side which is made of a plastic in which sleeve the ironless field windings are embedded. This sleeve is located in a casing which is also formed like a pot and is made of a ferromagnetic material.

The German patent DE 32 37 196 is already an improvement on the prior art described above, as the assembly of the motor is simplified, the abrasion of ferromagnetic particles from the rotor assembly during the assembly being eliminated from the start due to the ironless field windings which are in addition completely embedded in the plastic.

The arrangement of DE 32 37 196 has the disadvantage that motors having ironless field windings always run with a very low efficiency because of the large air gap. Therefore, they are mainly used as micro motors for high speeds, preferably in the field of dentistry. However, for the delivery of larger torques, as is required for motor vehicle applications, for example, they are completely unsuited.

Moreover, the internal-rotor motor of DE 32 37 196 has the disadvantage that the hermetic encapsulation of the rotor assembly does not allow a direct, mechanical coupling of a load, but that the torque transmission from the rotor to a shaft must be only in an indirect manner, e.g. by means of magnetic coupling, as is described in the patent specification.

U.S. Pat. No. 4,999,533 discloses a motor having an enclosed rotor unit which is inserted into the stator core by press fit. GB-A-2,186,635 discloses a centrifugal pump having a rotor enclosed in a cylindrical component, the cylindrical component being inserted into a stator core. A similar arrangement is known from U.S. Pat. No. 3,733,504. This document additionally discloses that the sleeve of the rotor assembly can be fixed in the stator by means of cement. To align the cylindrical component, the stator core comprises stop edges.

SUMMARY OF THE INVENTION

It is the object of the invention to provide a rotor assembly for an electric motor as well as an internal-rotor electric motor which can be assembled with minor-engineering within a short time and which ensure that no foreign particles penetrate into the interior of the motor, and in particular into the working air gap, during assembly and operation.

This object is accomplished by a rotor assembly having the features of claim 1 as well as by an internal-rotor electric motor according to claim 12. The invention also provides a method for manufacturing an internal-rotor electric motor.

The rotor assembly according to the invention has the advantage that the entire rotor assembly can be pre-assembled in the sleeve, the pre-assembly being performed in a clean room, for example, to ensure that no foreign particles enter the rotor assembly. The rotor assembly is preferably designed in such a way that the rotor shaft is led out of the sleeve at one end thereof, the sealing between the sleeve body and the rotor shaft being performed through bearings in the end faces of the sleeve which rotatably journal the rotor shaft. This does not produce a hermetical sealing of the rotor assembly, but the sleeve is sufficiently sealed in its end faces by the bearings, which are in addition protected by seals against the penetration of foreign particles, to avoid the penetration of solid particles. One end face of the sleeve should comprise an opening for leading out the rotor shaft, whereas the opposite end face may be completely closed as required.

The sleeve according to the invention avoids the above-described problem of the prior art that when the rotor assembly is inserted into the stator, ferromagnetic particles are abraded from the permanent magnet(s) and enter the air gap. The sleeve enclosing the rotor is preferably made of plastic and the rotor as a whole is inserted as a pre-assembled assembly into the interior of the stator so that no problems with the abrasion of ferromagnetic particles can occur.

As the rotor can be indirectly fitted into the plastic sleeve through the bearings with a very small concentricity error and the plastic sleeve, in turn, can be fitted into the stator almost free from backlash, a concentricity between rotor and stator which is substantially improved on the prior art can be obtained. In addition, a metallic contact between the bearings and any frame components such as flange, cover and the like is eliminated from the start so that the transmitted structure-borne noise can be substantially damped and, hence, also the acoustic emission can be reduced by up to 10 dB according to first studies performed by the applicant.

The rotor assembly enclosed in the plastic sleeve has the further advantage that it self-centres in the axial direction by the magnetic forces between the rotor assembly and the stator when it is inserted into the stator so that no further measures must be taken, such as the provision and adjustment of stops, to properly position the rotor within the stator. It only should be taken care to ensure that the rotor assembly can move within the stator sufficiently freely in the axial direction so that no stop, closed end or the like prevents the rotor assembly from magnetically centring by itself.

The sleeve according to the invention to be used for the rotor assembly consists of a sleeve wall and preferably an additional stiffening structure on the outside of the sleeve wall. This ensures that the sleeve is, on the one hand, sufficiently stable and, on the other, can be used even if the working air gap determined by the inner contour of the stator and the outer contour of the rotor is very small. The actual sleeve wall may be thinner than is necessary for the stability of the sleeve, because the stiffening structure gives additional strength to the sleeve. If the air gap is sufficiently large, the sleeve wall may also be dimensioned without a stiffening structure in such a way that it is sufficiently stable. The stiffening structure is preferably formed as ribs in such a way that the outer contour of the stiffening on the outside of the sleeve is adapted to the inner contour of the stator. This results in an optimum utilization of the interior space of the stator and, in addition, in the advantage that the rotor assembly can be inserted into the stator free from backlash and in a torsion-resistant manner, because the outer contour of the stiffening structure and the inner contour of the stator engage.

The rib structure advantageously comprises in the longitudinal direction of the sleeve or diagonally thereto ribs extending along the outside of the sleeve so that the rotor assembly can be inserted into the stator by guiding it rectilinearly or along a helical line through the inner contour of the stator.

For easy assembly, bearings for supporting the rotor shaft are pre-mounted thereon so that the rotor can be inserted into the sleeve along with the bearings.

According to one embodiment, the sleeve comprises a substantially cylindrical encapsulation section and a flange section which can be engaged with each other. That is, the encapsulation section and the flange section are slid over the rotor shaft from opposite ends and form together a closed frame around the rotor.

The sleeve is adapted to the shape of the rotor and is generally cylindrical. As described below, the sleeve may have a two-piece or, for example, a three-piece design having a cylindrical central portion and two end sections.

The bearings for supporting the shaft are preferably located in the end faces of the sleeve in such a way that they bear against stops so that the rotor assembly, after the encapsulation and flange sections have been assembled, is enclosed in the sleeve in a sealed manner.

Further, the invention provides an internal-rotor electric motor having a rotor assembly of the type described above and a stator, the rotor assembly being inserted in the stator and the sleeve comprising a wall thickness equal to or smaller than a working air gap between an outer diameter of the rotor and an inner diameter of the stator.

Preferably, the outer contour of the stiffening structure on the outside of the sleeve is adapted to the inner contour of the stator, the ribs of the stiffening contour being located between the stator poles.

Alternatively or additionally, the stator sheets of the stator may be provided with inner grooves on the stator poles which can be engaged with additional stiffening ribs on the outside of the sleeve.

Preferably, the rotor assembly is inserted into the stator free from backlash in such a way that the rotor centres by itself within the stator core in the axial direction.

Thus the invention provides a rotor assembly for an electric motor and an internal-rotor electric motor in which the rotor is pre-assembled in a sleeve along with the bearings and this rotor assembly is inserted into the stator. The rotor shaft is led out of the sleeve, the sleeve wall along with the bearings and the seals thereof ensuring a sufficient sealing of the rotor assembly. In addition, the stiffening structure allows the sleeve to be formed in such a way that it has a very thin wall so that this rotor assembly is suited even for a very small working air gap between stator and rotor. The stiffening structure may be designed in such a way that it is adapted to the inner contour of the stator and, for example, engages with the pole gaps of the stator. The construction according to the invention yields a very compact, and simple as well, rotor assembly which can be completely pre-assembled in a clean room, for example, and is then inserted as a whole into the stator. The provision of the sleeve can prevent ferromagnetic material from being abraded and from penetrating into the working air gap when the rotor assembly is inserted into the stator. The encapsulated rotor assembly also prevents the penetration of other foreign particles. Moreover, the encapsulation of the rotor assembly having a sleeve preferably made of plastic leads to the effect that the rotor centres by itself in the axial direction when it is inserted into the stator and that no structure-borne noise is transmitted from the rotor to the stator or the motor frame as appropriate.

BRIEF DESCRIPTION OF THE DRAWINGS

The invention is explained below by way of preferred embodiments thereof with reference to the drawings, wherein.

DESCRIPTION OF THE PREFERRED EMBODIMENTS

Figure 1:
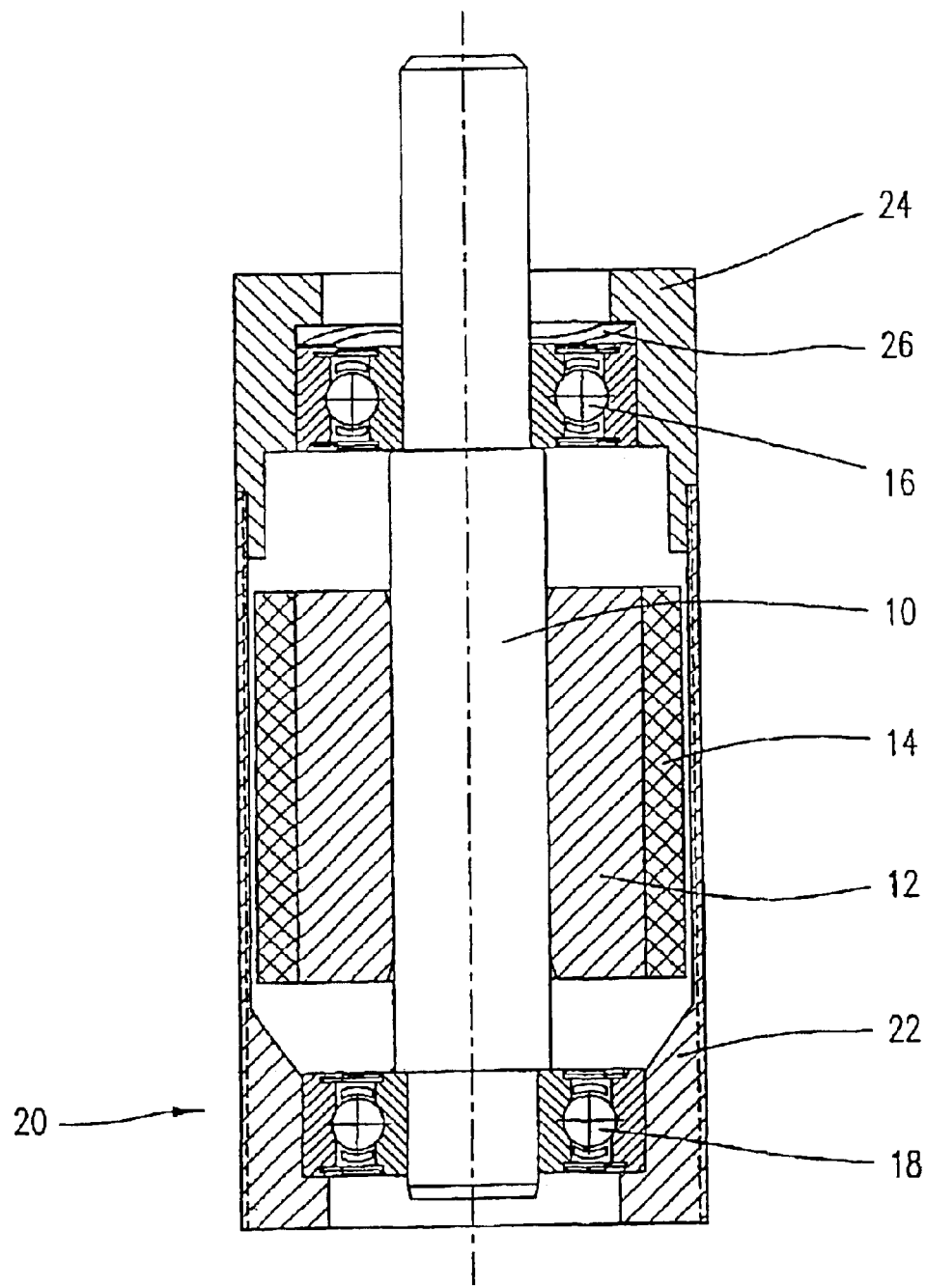
FIG. 1 shows a cross-sectional view of a rotor assembly according to the invention.

FIG. 1 shows a cross-sectional view of a preferred embodiment of a rotor assembly according to the invention. The rotor assembly according to the invention comprises a rotor shaft 10 carrying a yoke ring 12 made of a soft magnetic material such as iron. A preferably annular permanent magnet 14 is attached on the yoke ring 12. The shaft 10 is rotatably journaled in bearings 16, 18, wherein the bearings 16, 18 may be formed as antifriction or friction bearings and specifically as roller bearings. The rotor which is formed here by the rotor shaft 10, the yoke ring 12 and the permanent magnet 14 is enclosed in a sleeve 20 comprising an encapsulation section 22 and a flange section 24 which will be explained in detail with reference to the FIGS. 2 to 5.

The bearings 16, 18 may be pre-mounted on the rotor shaft 10 and are placed in the end faces of the sleeve sections 22, 24 and are pressed in them and/or adhered to them or are held in another suitable way. In the illustrated embodiment, an annular spring element, e.g. an ondular washer 26, is provided in the end face of the flange section 24 adjacent to the bearing 18 for the compensation of the axial sum tolerances. Through this ondular washer, the two bearings 16, 18 can be additionally braced against each other free from backlash.

The rotor assembly according to the invention is shown with its basic elements in FIG. 1, wherein the specific dimensioning and particular arrangement of the elements may vary. Specifically, roller bearings 16, 18 are provided in FIG. 1, wherein the rotor may alternatively be rotatably journaled in any other suitable way such as by friction bearings, hydraulic bearings, air bearings, etc. Also, the rotor assembly may farther comprise other elements then those illustrated. Between the outer circumference of the permanent magnet 14 and the inside of the sleeve 20, an air gap as small as possible is provided which allows the relative movement between the fixed sleeve and the rotating rotor. Depending on the requirements of the rotor assembly and electric motor, many other modifications of the embodiment shown will become apparent to a person skilled in the art.

The sleeve 20 is preferably made of plastic by injection moulding or extrusion moulding. A particularly suitable plastic is LPC (liquid crystal polymer). Other materials include polyacetal, polyoxymethylene (POM), polysulphone (PSU), polycarbonate (PC), polyphenylene sulphide (PPS), polyamide imide (PAi), polyether ether ketone (PEEK), polyether sulphone (PES), polyether imide (PEi).

Figure 2:
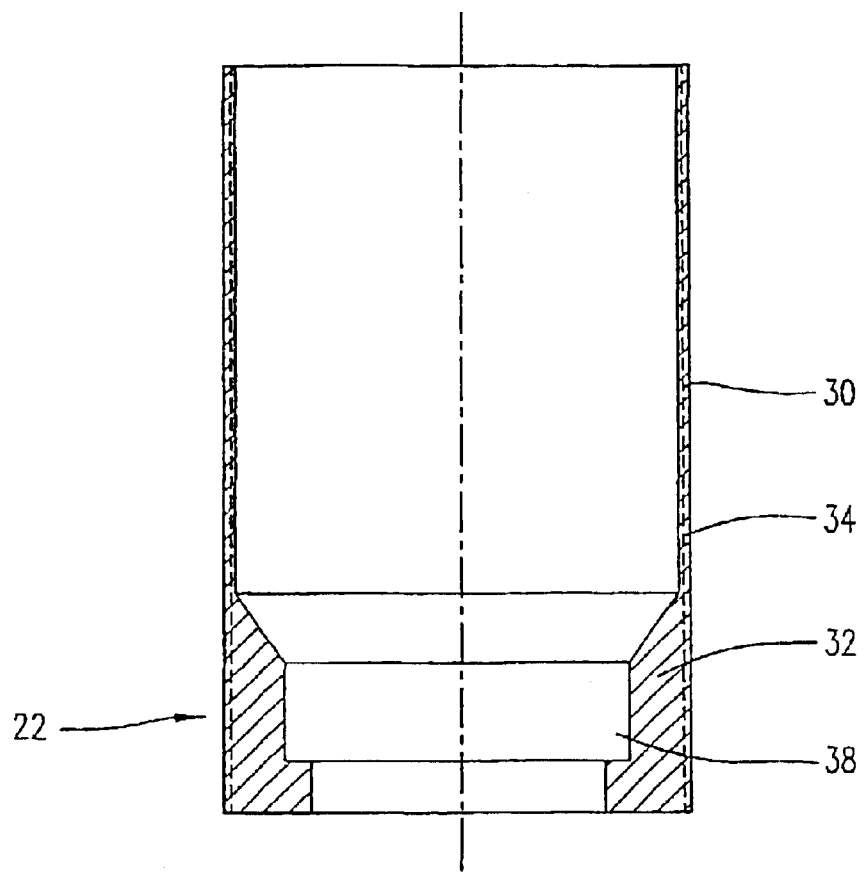
FIG. 2 shows a cross-sectional view of an encapsulation section.
Figure 3:
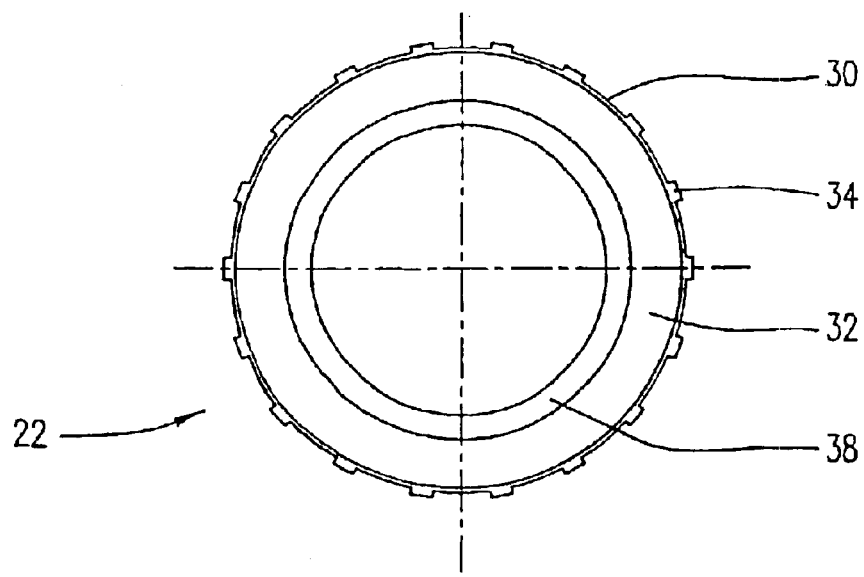
FIG. 3 shows a top view of the encapsulation section of FIG. 2.
Figure 4:
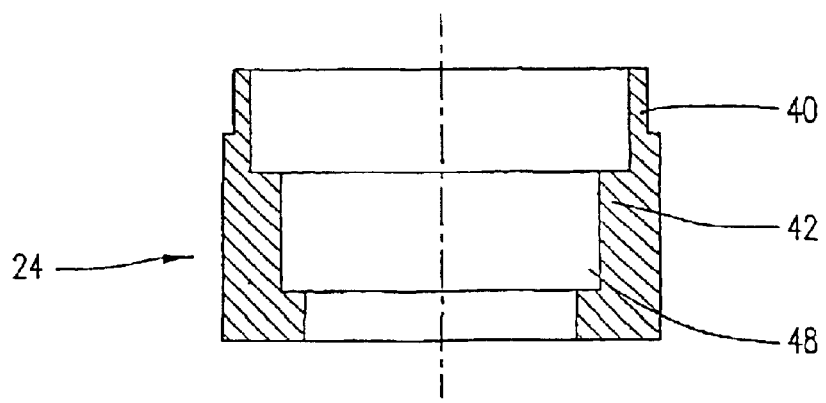
FIG. 4 shows a cross-sectional view of the flange section of the sleeve according to the invention.
Figure 5:
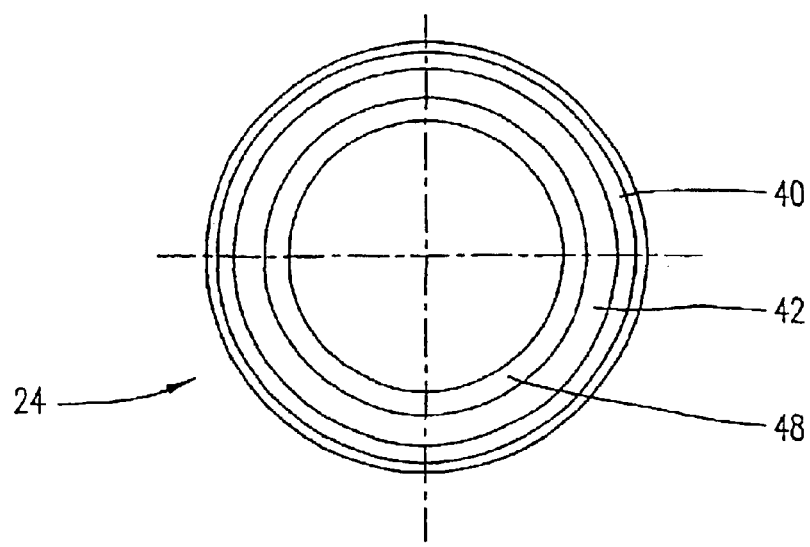
FIG. 5 shows a bottom view of the flange section of FIG. 4.

In the embodiment shown, the sleeve 20 is composed of a cup-like encapsulation section 22, which is shown in detail in FIGS. 2 and 3, and a cover-like flange section 24, which is shown in detail in FIGS. 4 and 5. This is only one embodiment of the invention, wherein the sleeve 20 may alternatively be formed of two substantially similar engaging cup sections or of three parts or may be formed in any other suitable way.

The encapsulation section 22 shown in detail in FIGS. 2 and 3 consists of an end wall 32 and an adjacent sleeve portion 30 having a relative thin inner wall. On the outside of the sleeve portion 30, longitudinal ribs 34 are formed, 18 longitudinal ribs 34 being provided in the embodiment shown. Of course, the invention is not limited to a particular number of ribs as long as a sufficient number of ribs is provided to give the sleeve 20 the required stiffness.

In the embodiment shown, the longitudinal ribs 34 extend substantially over the entire length of the cylindrical sleeve 20 and are aligned parallel to the longitudinal axis thereof. In other embodiments, the ribs might extend diagonally, for example, the number and design of the ribs being adapted to the inner contour of the stator, as will become apparent with reference to FIG. 6.

Figure 6:
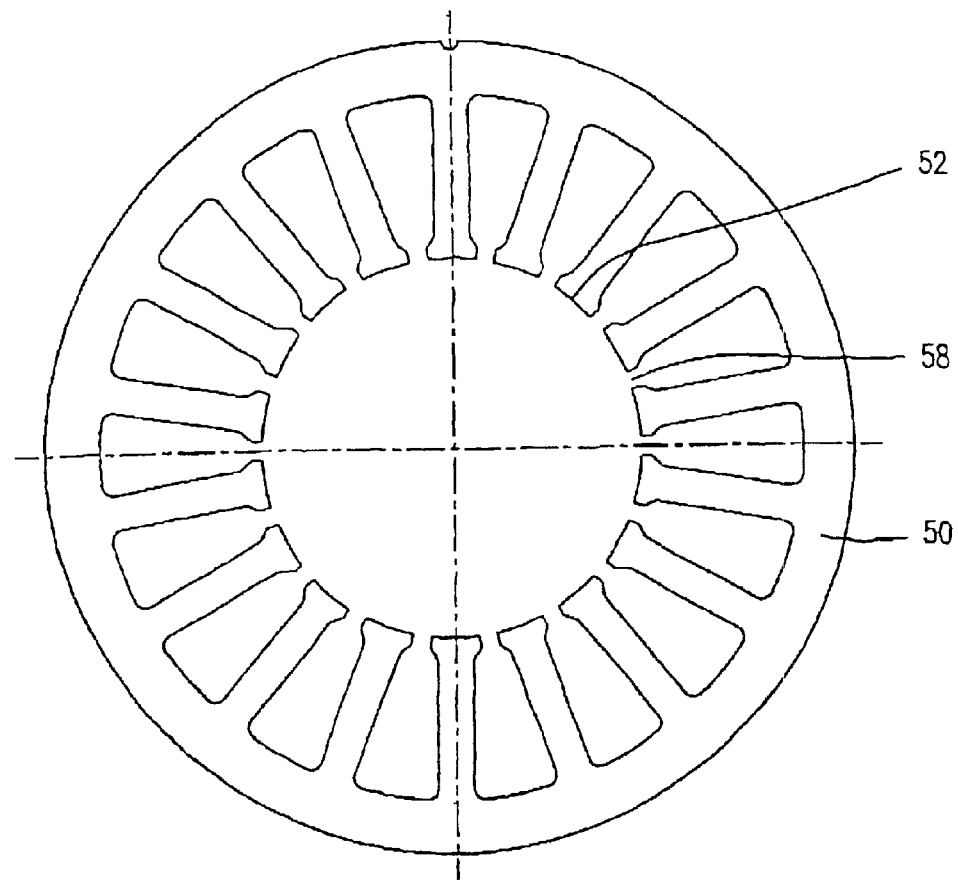
FIG. 6 shows a top view of a stator sheet.

FIG. 6 shows a single stator sheet 50 having stator poles 52 and pole gaps 58. In the embodiment shown, the longitudinal ribs 34 are formed and arranged on the outside of the encapsulation section 22 of the sleeve 20 in such a way that these longitudinal ribs 34 engage with the recesses of the pole gaps 58 when the rotor assembly is inserted into the stator.

In another embodiment, ribs may be additionally or alternatively formed and arranged in such a way that they engage with grooves (not shown) arranged on the radially inwardly directed end faces of the stator poles.

It is not crucial to the invention that the number of ribs coincides with the number of pole gaps, but they may rather be in any proportion to each other.

If the ribs, as in the embodiment shown, are formed as longitudinal ribs 34 running parallel to the longitudinal axis of the sleeve 20, the whole of the rotor assembly can be rectilinearly inserted into the stator. If they are, for example, diagonally arranged on the sleeve, the rotor assembly would have to be "screwed into" an appropriate stator having angular pole gaps, the stator in this case being constructed of stator sheets twisted relative to each other by a particular angle.

Referring again to FIGS. 2 to 5, the flange section 24 of the sleeve 20 is formed with a relative short side wall 40 and an end wall 42 in such a way that the flange section 24 can be inserted into the encapsulation section 22. Preferably, the sleeve sections 22, 24 are joined by adhesive bonding, welding or in another suitable way.

In each of the two end walls 32, 42 of the sleeve sections 22, 24, one fit 38 and 48, respectively, is formed, into which the roller bearings 18, 16 or any other suitable bearings for supporting the shaft 10 can be fit.

Figure 7:
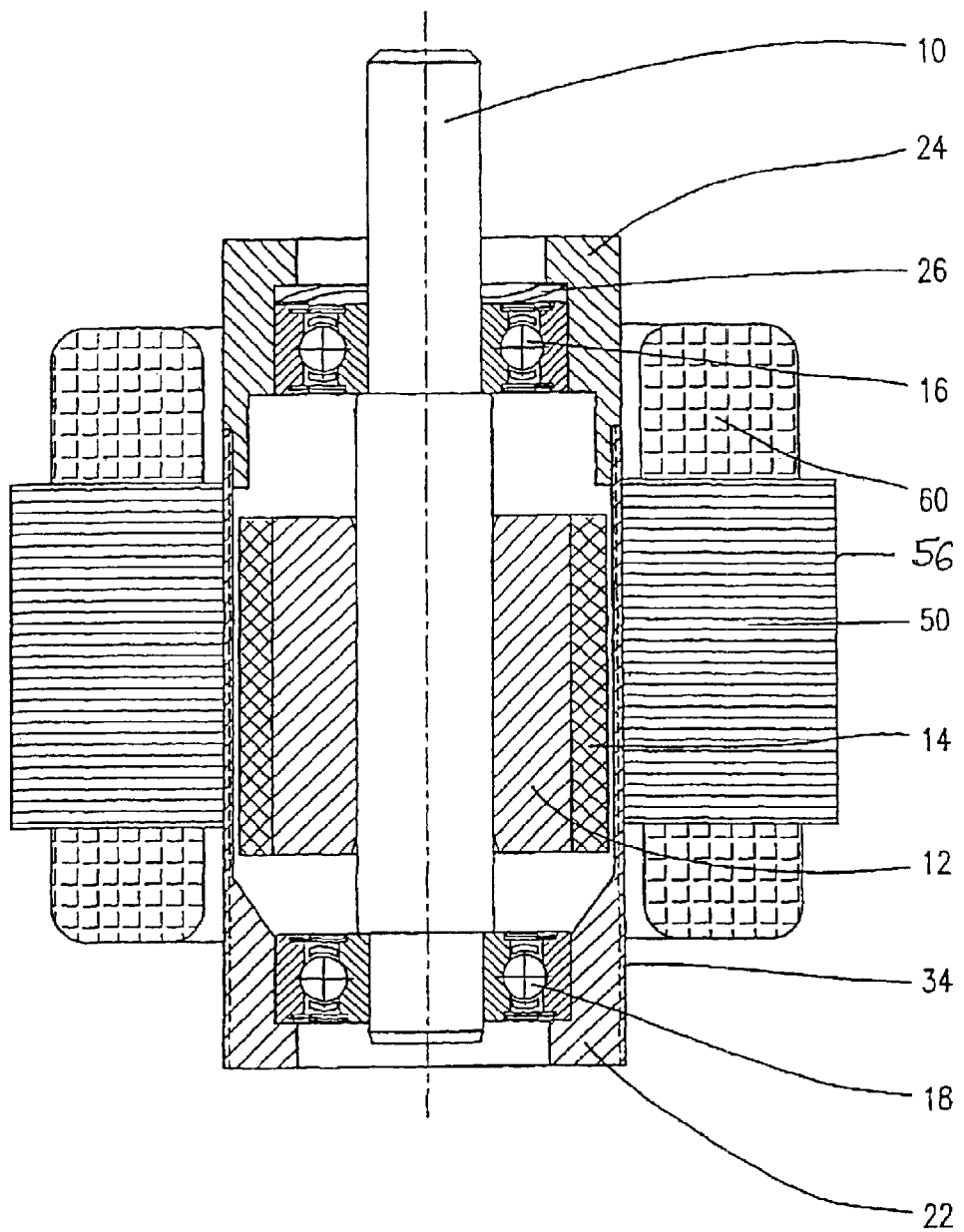
FIG. 7 shows a cross-sectional view of an internal-rotor electric motor according to the invention.

One embodiment of the internal-rotor electric motor according to a preferred embodiment is schematically illustrated in FIG. 7. The same elements or elements similar to those in FIGS. 1 to 6 are denoted by the same reference symbols and are not explained here again.

FIG. 7 shows the rotor assembly according to the invention explained with reference to FIG. 1 which is inserted in the interior of a stator 56. The stator 56 is schematically illustrated in FIG. 7 by a stack of sheets constructed of individual stator sheets 50 and by a winding 60. A broken line 42 indicates the engagement of the longitudinal ribs 34 in the pole gaps 58 formed between the stator poles 52.

The internal-rotor electric motor according to the invention can be easily manufactured by first pre-assembling the rotor assembly preferably in a clean room. To that end, the iron yoke ring 12 and the permanent magnet 14 are attached to the rotor shaft 10 and the bearings 16, 18 are pre-mounted on the rotor shaft 10. The two sleeve sections 22, 24 are slid over the rotor from opposite ends of the shaft 10 and are joined with each other and are preferably additionally bonded or glued to each other. The rotor bearings 16, 18 then fit tightly in the end faces 32, 42 of the sleeve sections 22, 24 and are braced by the ondular washer 26.

Before the completely pre-assembled assembly is inserted into the interior of the stator 56, in which the assembly is free to move in the axial direction, and is aligned by "self-centring magnetic forces" into the magnetic centre, a preferably liquid plastic may be applied to the outside of the sleeve for permanently connecting the assembly to the stator.

In the embodiment shown, the two ends of the stator ring are open so as not to constrain the axial movement of the rotor assembly. Other constructions of the stator will be apparent to a person skilled in the art, the invention offering the major advantage that no stops or other means for centring the rotor within the stator are needed.

After the rotor assembly has been inserted into the stator, the adhesive fills the still existing spaces at least partially and ensures after curing a tight, stationary fit of the rotor within the stator.

The complete encapsulation of the rotor and the enclosing of all moving, rotating parts in a sleeve which is fixed relative to the stator and a motor frame as appropriate drastically reduce the transmission of structure-borne noise and hence the acoustic emission of the whole of the motor, as was mentioned above.

The internal-rotor motor constructed in this way may now be moulded in or potted or may be inserted into an encasing frame or may be provided with a fixing flange arranged on the end face, without impairing the function in any way.

The stator 56 does not need to be particularly adapted to the rotor assembly according to the invention. The connections between the individual components such as shaft 10, yoke ring 12 and permanent magnet 14 or between encapsulation sections 22, 24 and bearings 16, 18 may be made by injection, adhesive bonding, welding, latching or in any other suitable way. The sleeve 20 and the stator 26 may be agglutinated after joining. To avoid an abrasion of plastic material of the sleeve 20 when the rotor is inserted into the sleeve, the edges of the permanent magnets 14 may be rounded or chamfered. Numerous further alterations and modifications of the invention will become apparent to a person skilled in the art.

The wall thickness of the sleeve portion 30 is selected such that it substantially fills the air gap between the permanent magnets 14 of the rotor and the inside of the stator 56, wherein, due to the rib stiffening, the inner wall of the sleeve portion 30 may alternatively be thinner than this air gap or the encapsulated rotor assembly according to the invention may be used even if the working air gap is very small. The ribs 34 are, as was explained above, formed in such a way that they are adapted to the inner contour of the stator and that they engage with the inner contour and that they give additional stiffness to the whole of the sleeve.

In addition to the embodiment shown, it may be provided to encapsulate the stator 56 as well and to mold it in plastic, for example.

The features disclosed in the above description, in the claims and the drawings may be, both individually and in any selection and combination, important to the realization of the invention in the various embodiments thereof.

List of Reference Symbols
10 Rotor shaft
12 Yoke ring
14 Permanent magnet
16 Roller bearing
18 Roller bearing
20 Sleeve (cylindrical)
22 Encapsulation section
24 Flange section
26 Ondular ring
30 Sleeve portion
32 End wall
34 Longitudinal ribs
38 Fit
40 Side wall
42 End wall
48 Fit
50 Stator sheet
52 Stator pole
56 Stator
58 Pole gaps
60 Winding

What is claimed is:

1. An electric motor comprising:
   a stator having a sleeve, said sleeve having a cylindrical portion and a flange portion, said cylindrical portion and said flange portion of the sleeve being connected;
   a rotor assembly having a rotor shaft and at least one permanent magnet arranged on the rotor shaft, the rotor shaft being rotatably housed in the cylindrical portion and the flange portion of the sleeve; and
   a first bearing and a second bearing supporting said rotor shaft for rotation within said sleeve;
   wherein said first bearing is integrated into the cylindrical portion of said sleeve, wherein said second bearing is integrated into the flange portion of said sleeve, wherein an external dimension of the rotor assembly and an internal dimension of the stator are selected such that the rotor assembly is free to move in the axial direction while the rotor assembly is inserted into the stator, and wherein the rotor assembly is aligned within the stator in the magnetic center of the stator by self-centering magnetic forces.

2. The electric motor of claim 1, wherein the sleeve further comprises a stiffening structure on the outside of the sleeve.

3. The electric motor of claim 1, wherein the sleeve further comprises a rib structure on the outside of the sleeve.

4. The electric motor of claim 3, wherein the rib structure comprises a plurality of ribs extending in the longitudinal direction of the sleeve or diagonally thereto along the outside of the sleeve.

5. The electric motor of claim 1, wherein the rotor shaft extends outside of the flange portion of the sleeve at a first end of the sleeve.

6. The electric motor of claim 5, wherein a second end of the sleeve is substantially closed by said cylindrical portion.

7. The electric motor of claim 1, wherein said first bearing and said second bearing are arranged at end faces of the sleeve enclosing the rotor assembly in the sleeve in a sealed manner.

8. The electric motor of claim 1, wherein the motor is an internal-rotor motor.

9. The electric motor of claim 1, wherein the stator further comprises stator sheets having stator poles pointing towards the interior of the stator.

10. The electric motor of claim 1, wherein a working air gap is formed between an outer diameter of the rotor and an inner diameter of the stator, and wherein the sleeve further comprises a wall having a thickness which is equal to or less than the working air gap.

11. The electric motor of claim 2, wherein an outer contour of the stiffening structure on the outside of the sleeve is adapted to an inner contour of the stator.

12. The electric motor of claim 11, wherein the stiffening structure further comprises ribs located in pole gaps provided between the stator poles.

13. The electric motor of claim 1, wherein the rotor assembly is inserted into the stator free from backlash.

14. The electric motor of claim 1, wherein the motor is potted.

* * * * *